( 12 ) United States Patent
Weiser et al.

(10) Patent No.: US 8,163,632 B2
(45) Date of Patent: Apr. 24, 2012

(54) IRRADIATION WITH HIGH ENERGY IONS FOR SURFACE STRUCTURING AND TREATMENT OF SURFACE PROXIMAL SECTIONS OF OPTICAL ELEMENTS

(75) Inventors: Martin Weiser, Sinsheim (DE); Stefan Burkart, Heidenheim (DE); Holger Maltor, Aalen (DE)

(73) Assignee: CARL ZEISS SMT GmbH, Oberkochen (DE)

( * ) Notice: Subject to any disclaimer, the term of this patent is extended or adjusted under 35 U.S.C. 154(b) by 1082 days.

(21) Appl. No.: 11/950,208

(22) Filed: Dec. 4, 2007

(65) Prior Publication Data

US 2008/0149858 A1 Jun. 26, 2008

(30) Foreign Application Priority Data

Dec. 4, 2006 (DE) .......................... 10 2006 057 105

(51) Int. Cl.
*H01L 21/00* (2006.01)
*G01N 23/20* (2006.01)
(52) U.S. Cl. .......................................... 438/480; 378/70
(58) Field of Classification Search ............ 250/492.21, 250/492.2; 372/32, 18, 28; 427/38
See application file for complete search history.

(56) References Cited

U.S. PATENT DOCUMENTS

| 4,840,816 | A | | 6/1989 | Appleton et al. |
|---|---|---|---|---|
| 4,994,141 | A | * | 2/1991 | Harms et al. ...................... 216/2 |
| 5,055,318 | A | * | 10/1991 | Deutchman et al. .......... 427/534 |
| 5,757,017 | A | * | 5/1998 | Braat .......................... 250/492.2 |
| 6,728,021 | B1 | | 4/2004 | Kohl et al. |
| 6,852,558 | B2 | * | 2/2005 | Lee et al. ......................... 438/32 |
| 7,052,819 | B2 | * | 5/2006 | Simpson ...................... 430/139 |
| 7,074,549 | B2 | * | 7/2006 | Simpson et al. .............. 430/350 |
| 2003/0058986 | A1 | * | 3/2003 | Oshino et al. ................... 378/34 |
| 2003/0081722 | A1 | * | 5/2003 | Kandaka et al. ................ 378/70 |
| 2003/0169060 | A1 | * | 9/2003 | Shinada et al. ............... 324/751 |
| 2005/0020011 | A1 | * | 1/2005 | Nakajima et al. ............. 438/257 |
| 2005/0233270 | A1 | * | 10/2005 | Simpson ...................... 430/619 |
| 2005/0243966 | A1 | * | 11/2005 | Loewen et al. ................. 378/84 |
| 2005/0254534 | A1 | * | 11/2005 | Loewen et al. ................. 372/32 |
| 2006/0243908 | A1 | * | 11/2006 | Shinada et al. ............... 250/310 |
| 2007/0210251 | A1 | * | 9/2007 | Ward et al. .................... 250/360 |
| 2007/0221843 | A1 | * | 9/2007 | Ward et al. .................... 250/309 |
| 2008/0031420 | A1 | * | 2/2008 | Loewen et al. ................. 378/119 |
| 2010/0215932 | A1 | * | 8/2010 | Schreiber et al. ............. 428/216 |

FOREIGN PATENT DOCUMENTS

DE 38 41 352 A1 6/1990
DE 41 36 511 C2 6/1993
* cited by examiner

*Primary Examiner* — Nikita Wells
*Assistant Examiner* — Johnnie L Smith
(74) *Attorney, Agent, or Firm* — Sughrue Mion, PLLC

(57) ABSTRACT

A method for processing the surface of a component, or the processing of an optical element through an ion beam, directed onto the surface to be processed, so that the surface is lowered and/or removed at least partially, wherein the ions have a kinetic energy of 100 keV or more, as well as optical elements processed by the method.

50 Claims, 3 Drawing Sheets a) b)

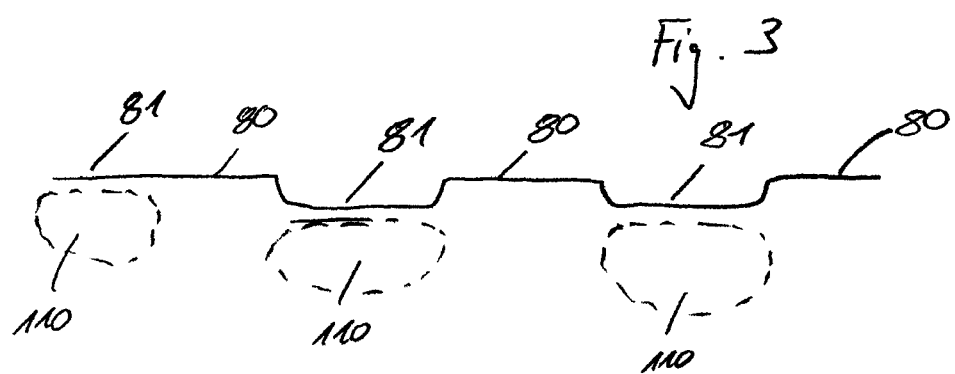
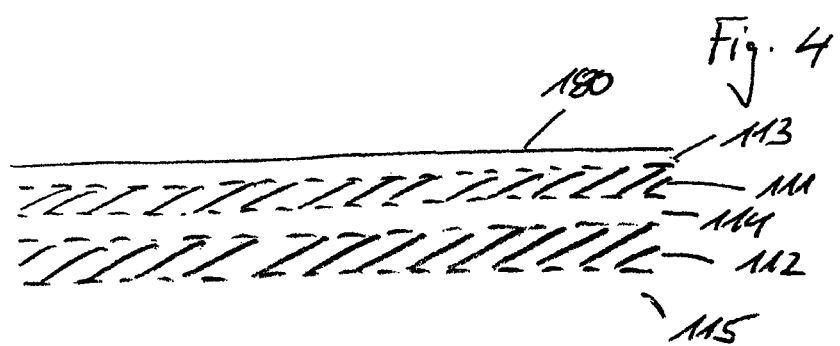

IRRADIATION WITH HIGH ENERGY IONS FOR SURFACE STRUCTURING AND TREATMENT OF SURFACE PROXIMAL SECTIONS OF OPTICAL ELEMENTS

BACKGROUND OF THE INVENTION

1. Field of the Invention

The present invention relates to a method for surface structuring of a component through an ion beam, and to a method for treating an optical element, in particular an optical element for an optical system in microlithography applications, with an ion beam as well.

2. Prior Art

In the state of the art different methods for treating materials and components with ion beams are known. Thus, it is known, e.g. to use focused ion beams (FIB) for imaging and manipulating surfaces. For these methods, acceleration voltages for ions, like e.g. gallium in the range of 5 to 50 kV, and corresponding currents of 2 pA to 20 nA are being used. The ion beam can be focused with electrostatic lenses to a diameter of a few of nm, and can then be guided over the surface, line by line, through respective deflection.

Through the interaction of the ion beam with the surface, so-called sputter processes (atomization processes) occur, which lead to the possibility of a treatment of the materials in the nm range.

However, this method cannot be used for topography corrections of optical elements, due to the direct removal of the surface, since, due to a local use of this method, also the micro-roughness is locally changed.

Furthermore, it is known e.g. to use ion beam methods with lower acceleration energies, this means ions with energies in the range of 0.2 keV to 1.2 keV for treating surfaces of optical elements, like e.g. lenses for objectives in microlithography applications. Herein, a lower acceleration voltage is being used, compared to the focused ion beam method, so that only a lower removal occurs directly in a layer of 1 to 2 nm from the surface. Thereby, it can be accomplished, that the micro-roughness of the surface is maintained, and only larger size topography errors are corrected. However, this method has lower efficiency, due to the lower removal rate. Furthermore, in the correction of topographic errors, in the range of <1 mm, there are problems with positioning precision, since ions in this energy range are hard to focus.

Furthermore, also high energy ion beam methods are known, in which ions are implanted in components or materials with acceleration energies of up to 3 MeV, or more. This method of ion implantation is mostly used for doting semi-conductors.

From DE 41 36 511 C2 a method for producing a Si/FeSi$_2$-heterostructure is known, wherein iron ions are implanted into a silicon substrate with the iron ions being irradiated with an energy of 20 keV to 20 MeV onto the substrate.

DE 38 41 352 A1 discloses e.g. the implantation of bor, carbon, nitrogen, silicon or hydrogen ions in a silicon-carbide layer during the production of a silicon carbide diaphragm for a radiation lithography mask. Herein ion implantations serve the purpose to achieve a stress relaxation and better optical transparency in an oxide layer formed during subsequent temperature treatment.

The U.S. Pat. No. 4,840,816 describes doping of crystalline oxides like LiNbO$_3$ with heavy metals for forming a beam waveguide. The ions are implanted with a doping density in the range of $1.2 \times 10^{17}$ to $2.5 \times 10^{17}$ ions per cm$^2$ with energies of about 360 keV at a temperature of $-190°$ C.

Due to these different areas of application, the basics of the interaction of ion beams with materials have already been researched intensively. From this research it is known that the ions are slowed down, when impacting the material, through various braking mechanisms, like inelastic collisions with bound electrons, inelastic collisions with atom nuclei, elastic collisions with bound electrons, and elastic collisions with atom nuclei etc. An overview of the resulting macroscopic and microscopic effects in amorphous silicon dioxide is given e.g. in the publication by R. A. B. Devine in "Nuclear Instruments and Methods in Physics Research" B91 (1994) pages 378 to 390.

DISCLOSURE OF THE INVENTION

Object of the Invention

It is an object of the invention to provide a method, allowing a surface structuring in the sense of a at least partial subsidence, and/or removal of the surface of a component with greater efficiency, resolution, and/or precision, than the currently known methods, wherein in particular the micro-roughness of the surface shall be maintained. A respective method shall be useable in particular for treating optical elements, like optical lenses or mirrors for optical systems in microlithography applications. Thus, in particular it shall not cause any undesired changes of the material, or of the optical element with this respect. Furthermore, an exact local treatment shall be possible.

Technical Solution

This object may be accomplished through methods or optical elements as particularized in the claims. Advantageous embodiments are subject matter of the dependent claims.

The invention is based on the inventors having found out as a surprise that when using high-energy ions, thus energies above 100 keV, through a change of the prevailing braking mechanism of the ions directly at the surface, no higher locally acting energies are available, than in the currently used method in the range of 1 keV. Accordingly, there are hardly any restructurings, or direct material removals directly at the surface. Thus, there is also no change in micro-roughness. In addition, coatings like anti-reflection coatings or reflection coatings being present at the optical surface are not influenced. Furthermore, mostly inelastic electron excitations (electronic stopping) can be observed in this energy range, and no elastic particle collisions (nuclear stopping) can be observed, so that far reaching changes in the material, which could lead to undesired and uncontrollable changes, when used in optical elements, were avoided. However, a subsidence, and thus structuring of the surface can be accomplished through a compaction or volume reduction.

At the same time, the high acceleration energies $\geq 100$ keV, in particular $\geq 200$ keV, and preferably $\geq 400$ keV, however provide the advantage that a very good beam guidance and focusing, and a very good positioning precision of the beam are possible.

Thus, a very effective processing or correction of topographic errors in the sub millimeter range can be accomplished.

The energy range of the ions can be in particular 500 keV to 5000 keV or 600 keV to 2000 keV, which, on the one hand assures that a respectively desired surface subsidence and/or a removal with simultaneously small further changes of the material occurs, and furthermore, a good handling of the ion beam with respect to the local positioning and focusing is facilitated.

Thus, preferably a processing and treatment of optical elements, like e.g. optical lenses from silica, fused silica, on silica based glass or ULE (ultra low expansion)-materials can be performed. Glass ceramic material, like Zerodur can also be processed. Altogether, processing of all materials is possible which are transparent or reflective at the wavelengths of the electromagnetic irradiation used for lithography and which do not undergo undesired changes of properties through processing.

Accordingly, every material, which can particularly be applied as refractive or diffractive material at wavelengths of 365 nm, 248 nm, 193 nm or 158 nm or as reflective material for EUV (extreme ultraviolet) radiation with wavelengths at 13.5 nm, may be used as material to be processed. Accordingly, reflective optical elements like mirrors and the materials correspondingly used therefor can also be processed. In particular, it is possible to process optical elements or optical surfaces, on which a coating is already provided, like e.g. refractive and diffractive optical elements with anti-reflection coatings or reflective optical elements with reflection coatings. Since the ions with the respective energies are slowed down in an area below the surface and lead to corresponding structural changes, which contribute to subsidence in the irradiated area, a corresponding coating can be maintained at the optical surface without any damages. Altogether, already finished, usable optical elements can be processed or can be corrected afterwards.

Only an increase of the refraction index in an area below the surface, which corresponds to the braking range of the ions, can be observed. This increase of the refraction index can be compensated through a respective optical layout of the optical system, and can thus even be used for targeted production of optical elements. In such a case possibly the correction of the surface or topography cannot be the prime concern, but the targeted adjustment of the optical properties, or of the refractive index in certain ranges of the optical element. Accordingly, this is an aspect of the invention, for which independent protection is claimed.

For example, ions having different energies can be subsequently irradiated into the same surface area so that the depth of the impact area is different. Thus, areas having a different refraction index can be generated e.g. in the direction of the irradiation direction starting from the surface. For instance, a near-surface layer of silica or fused silica may have a refraction index of e.g. 1.5 at a wavelength of the used electromagnetic irradiation of 193 nm, while in the subsequent braking area of the high-energy ions, the refraction index is raised to a value of 1.6 to 1.7 and in the subsequent area again the original value of the respective material of 1.5 is present. In a further, lower-lying layer ions with higher energy as those, which contributed to the changes of the first layer area with amended refraction index, may again generate an area with elevated refraction index in the range of 1.6 to 1.7 so that a layered structure of alternating low and high refraction index layers is obtained. Thus, a layer stack of thin layers having different refraction indices may be produced, which can be used as reflection structure, for example.

Through the missing interaction of the ion beam with the material directly at the surface, the micro-roughness of the surface can be maintained. In particular, in a range of 0.05 to 0.2 nm RMS (root mean square) at a local wavelength of 10 nm to 100 μm, the micro-roughness can be maintained in spite of the surface treatment.

The surface removal with direct removal of material is negligible at the respective energies. The surface subsidence with volume change in a depth area of 100 nm from the surface is however accomplished in particular through a change of the material structure in the braking range of the ions. It depends on the energy of the impacting ions and on the fluence, this means the imparting ions per surface area. However, saturation can occur beyond a certain fluence. The change of the material structure can be caused e.g. in the case of silica material through a change of the average 12-ring tetraeder structure into an average 3 to 4-ring tetraeder structure.

The beam current of the ion beam can assume values of 1 to 100 nA, preferably 5 to 25 nA, and in particular 10 nA. The value of 10 nA corresponds in Si-ions approximately to $6 \times 10^{11}$ ions per second. Thus, depending on the irradiation time, fluences, i.e. impacting particles per surface area, in the magnitude of $10^{13}$ to $10^{16}$ ions per cm$^2$ are reached.

The ion beam may have a diameter of 1 to 5000 μm, in particular 10 to 2000 μm, especially 50 to 200 μm, wherein a positioning with any desired precision is possible. However, a positioning in the magnitude of a tenth of the beam diameter is sufficient for the present application, so that the ion beam can be positioned with an accuracy of 0.1 to 50 μm, in particular 1 to 20 μm.

During the process, the ion beam can be moved over the surface to be treated, wherein the beam is deflected by respective electrical and/or magnetic components, and guided over the surface to be treated. Alternatively, also the piece of material can also be moved relative to the ion beam, wherein the deflection of the ion beam is preferred in case of a locally fixed surface, which is to be treated, due to the positioning precisions which can be reached.

The processing or treatment can be performed in a lateral range of up to several 100 mm. The lower limit is thus given by the beam diameter and preferably amounts to 10 μm.

Different species can be used as ions, wherein ions of noble or inert gases like elements of the 8$^{th}$ main group of the periodic table with helium, neon, argon, krypton, xenon, radon or ununoctium as well as nitrogen or oxygen are advantageous. Further, ions of elements or compounds, which are included in the material to be processed, can be used. In particular, silicon ions can be used for fused silica, or glass ceramic materials, like Zerodur, which are used in optical elements, in particular refractive or diffractive optical elements in objectives for microlithography applications, since they can be integrated into the network of the material, without leading to far-reaching changes of the materials properties due to being a foreign material. In general, non-metals or non-semi-metals are therefore preferred, in particular as they are contained in the optical element.

As already mentioned above, only an increase of the refraction index through compacting the material in the area of the braking range of the ions is observed, wherein the refraction index can be continuously increased, in case of fused silica from 1.5 to 1.6 to 1.7 for a wavelength of the light used of 193 nm. This effect, however can also be advantageously used in case of optical elements to produce structures with different refraction indices, which is also an aspect of this invention.

In general, a continous increase of the refraction index can be achieved for the corresponding optical materials like fused silica, silica, silica-based glass, ultra-low expansion (ULE)-material or glass-ceramic material like zerodur in the magnitude of 0 to 20%, particularly 5 to 15% for the wavelength range in the magnitude between 150 nm and 350 nm, particularly in the wavelength range of 190 nm to 250 nm which is the wavelength range which is interesting for refractive or diffractive optical elements in microlithography.

Processing of the surface of a respective optical element or component with the ion beam can be carried out at ambient temperature in the temperature range of 0° C. to 50° C., preferably 15° C. to 30° C. and particularly at room temperature.

After the ion beam treatment, the treated component can be exposed to a temperature treatment, and in particular to a temperature treatment at preferably more than 200° C., in particular 300° C. or more, for a duration of several hours, and in particular 24 hours, so that possible structural damages can be healed. However, the accomplished geometric effects, like e.g. subsidence, and/or removal of the surface and the compacting of the material, are maintained in the braking area.

Accordingly, optical elements can be produced by means of the present inventive method, namely in particular optical lenses or mirrors, wherein the optical elements comprise a near-surface area which is spaced to the surface, i.e. is located with a distance to the surface, with the near-surface area having an increased refraction index compared to the surrounding areas without amendment of the material composition, i.e. for areas having identical chemical compositions. For example, an isle-like area with increased refraction index can be achieved, which serves for correction of aberrations in an optical system of a micro-lithography installation, like an illumination system or projection objective. Furthermore, it is also possible to provide a layer with increased refraction index over the whole optical surface of the optical element or at least in a partial area thereof. The layer can be positioned in an area of 100 nm to 5 μm beneath the surface depending on the chosen energy of the ions.

According to a multiple treatment of the same surface area with ions of different energies, areas with different refraction indices may be produced, with the areas of different refraction indices succeeding each other in depth direction. The areas with different refraction indices may adjoin each other or may be separated by areas having a lower refraction index. The latter is a preferred structure in a direction across the surface, particularly perpendicular to the surface, with subsequent and alternating areas with increased and lower refraction index. Such a structure can be used as a reflector for electromagnetic irradiation and may be adapted according to the wavelength of the electromagnetic irradiation with respect to the thicknesses of the different areas.

The areas with increased refraction index may correspond with surface sections which are lowered with respect to surrounding surface sections so that according to the near-surface structure with different refraction indices at the same time a structure with respect to topography is present. For example, this is given, when the inventive method is carried out at an originally flat surface. However, the method can also be used with an already structured surface, i.e. a surface having a topography formation so that after carrying out of the method the different refraction indices are present in near-surface areas, but the surface being again flat or flush, respectively.

BRIEF DESCRIPTION OF THE FIGURES

Further advantages, characteristics and features become apparent during the subsequent detailed description of an embodiment, based on the appended drawings. The figures show in a purely schematic manner in:

FIG. 3 a sectional view across a surface of the first optical element; and in

FIG. 4 a sectional view across the surface of a second optical element.

PREFERRED EMBODIMENT

Figure 1:
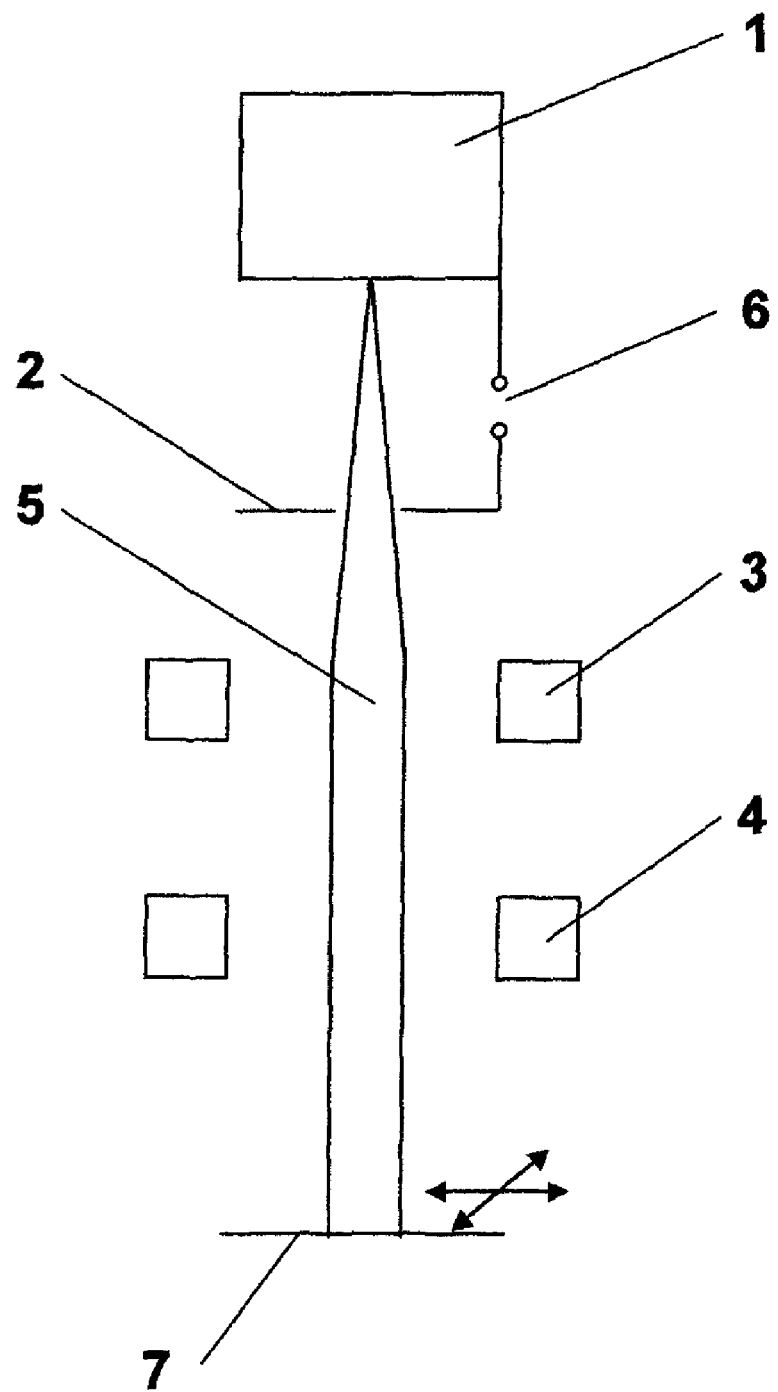
FIG. 1 the illustration of the principle of a device, which can be used for the method according to the invention.

FIG. 1 shows a device for performing the method according to the invention in a schematic illustration. In an ion source 1, ions are generated, which are accelerated towards an aperture 2, through a respective voltage applied by a voltage source 6. Through ion beam optics 3, which are made from suitable electrical and/or magnetic components, the ion beam 5 can be focused. The focused ion beam can be deflected into two different directions, which are illustrated by the double arrows, through a deflection unit 4, which in turn comprises respective electrical and/or mechanical components. Accordingly, the ion beam 5 can be guided in a scanning manner over the component to be worked or treated, wherein the ions there interact with the material of the component 7 to be processed.

The generation of the ions in the ion source 1, and a possible extraction of the ions through an electrostatic field, or the separation of the ions, corresponding to their mass in a magnetic field, can be performed according to known methods and is not illustrated and described here in more detail.

According to a preferred embodiment, a device illustrated in FIG. 1 was used in order to irradiate silicon ions with energies in the range of 500 to 2000 keV onto silica. With 700 keV Si-ions, the range of the ions in the material amounted to approximately 1 μm, wherein the maximum range depends on the energy of the ions used, with $E^{2/3}$. The physical material removal during an irradiation with $10^{16}$ ions per $cm^2$ amounts to 1 nm, while the effective surface subsidence amounts to several 10 nm through a change of the material structure in the braking range of the ions.

Through the compaction in the braking range of the silicon ions, an increase of the refraction index to values of 1.6 to 1.7 occurs.

Subsequent to the treatment with the ion beam, there is a temperature treatment at 300° C. for 24 hours. Through the temperature treatment, the accomplished geometric effects with respect to the subsidence of the surface and compaction in the subsequent area are not changed. However, there is a healing of other disorders, since the absorption maxima found before the tempering at wavelengths of 216 nm, 243 nm, and 280 nm, cannot be formed anymore after the temperature treatment. A change of the transmission at a wavelength of 193 nm cannot be detected through the entire treatment of the silica.

Figure 2:
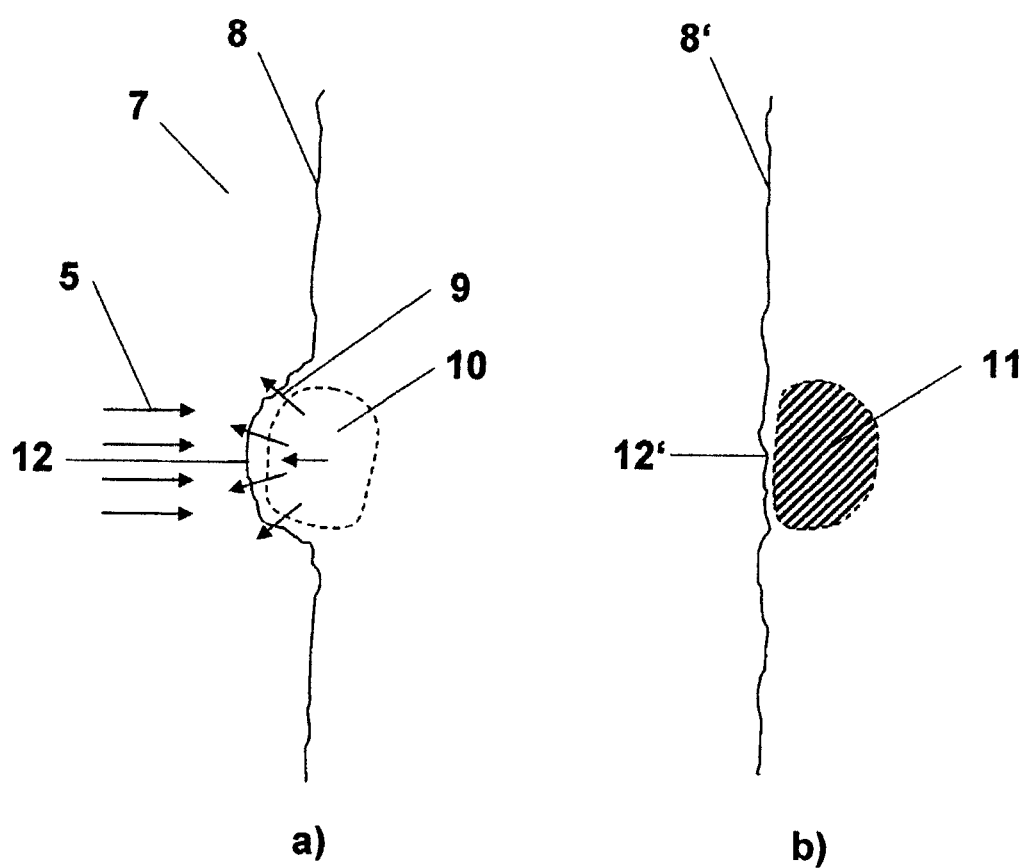
FIG. 2 a depiction of the mode of operation of the method.

FIG. 2 shows the use of the method according to the invention, and the interaction of the ion beams with the material to be treated in the form of two schematic images a) and b). In the left partial image of FIG. 2 a), the surface 8 of the part 7 to be treated is shown with a surface roughness 12 in the form of a surface elevation. Through the treatment of the area of the surface 8, which is associated with the surface elevation 12 through ion beams 5, according to the presented method, due to the high energy of the ions >100 keV or >500 keV in the selected embodiment a penetration of the ions occurs in a section 10 below the surface 8 of the material. In the penetration section 10, the ions are increasingly slowed down through inelastic particle collisions, so that a change of the structure of the material and a compacting occurs through repositioning into an energetically more favorable state.

Furthermore, in particular cases, also a removal of material occurs from the work piece 7, wherein the removed material, as indicated by the arrows 9, does not originate from an area directly at the surface 8, but from areas located below. At the surface 8, there is no direct interaction with the high energy ions of the ion beam 5, since the kinetic energy of the ions in this area is too high. Thus, the surface structure is also not changed directly, this means the surface roughness is not changed and is maintained, as also the partial image b) of the FIG. 2 shows for the state after the treatment.

Through the compaction of the braking area 10 through the irradiated high energy ions, thus after the treatment a respectively compacted range 11 under the surface 8' is present, wherein the surface elevation 12' is removed. In the compacted area 11, there is an increased refraction index of the treated silica in the range of 1.6 to 1.7.

FIG. 3 shows a sectional view across the surface of an optical element which was treated with the method according to the present invention. The surface comprises sections 80 which are untreated, as well as sections 81 which were irradiated with corresponding ions. Accordingly, below sections 81 in which treatment of the optical element with high energy ion beams took place, compacted areas 110 can be found which comprise an increased refraction index, for example. For two compacted areas 110 compactions are associated with subsidence of the surface sections 81 with respect to the surrounding, non-treated sections 80. For the compacted area 110 at the left side of FIG. 3, the corresponding surface section 81 is disposed in the same plane as the adjoining, untreated section 80. This is achieved, when, as shown in FIG. 2, the original surface sections was elevated with respect to the surrounding sections so that by compaction of the underlying material a leveling has taken place.

FIG. 4 shows in a further sectional view across the surface area of an optical element the formation a layer structure comprising areas with none-increased refraction index 113, 114 and areas with increased refraction index 111, 112.

The untreated material 115 may e.g. have a refraction index of 1.5 at wavelengths of the used light of 193 nm. Due to subsequent or simultaneous irradiation with ions of different energy leading to a penetration of ions in differently deep areas 111 and 112, the corresponding material is compacted and an increase of the refraction index in the areas 111 and 112 is created. Between the areas 111 and 112 having increased refraction indices an area 114 may be present, as shown in FIG. 2 in which the originally lower refraction index is present. However, the energy of the ions may also be such that the areas with increased refraction index 111, 112 lie adjacent to each other or merge continuously. Due to use of high energy ions having a minimum energy an unchanged area 113 directly in the neighborhood to the surface 180 remains.

Through a structure as shown in FIG. 4 a reflactor can be formed in which the refraction indices of the areas 111, 112, 113, 114 and 115 as well as the corresponding thicknesses are set such that light of specific wavelength is reflected.

Though the present invention has been described in detail with reference to a preferred embodiment, it is appreciated by a person skilled in the art that variations and changes, in particular through a different combination of the described features of the invention, and also the omission of particular features are possible, without departing from the scope of the appended claims.

What is claimed is:

1. A method for processing a surface of a component, comprising irradiating the surface by directing an ion beam onto the surface, and thereby lowering the surface at least partially by compacting an area beneath the surface, wherein ions of the ion beam comprise a kinetic energy of at least 100 keV.

2. A method according to claim 1, wherein the ions comprise a kinetic energy of at least 200 keV.

3. A method according to claim 1, wherein the ions comprise a kinetic energy of at least 400 keV.

4. A method according to claim 1, wherein the ions comprise a kinetic energy of 500 keV to 2000 keV.

5. A method according to claim 1, wherein the processing is carried out at an optically effective, usable surface of an optical component.

6. A method according to claim 1, wherein the surface comprises a coating.

7. A method according to claim 6, wherein the coating comprises at least one of an anti-reflection layer or a reflection layer.

8. A method according to claim 1, wherein the irradiating restructures the component in at least one of a lateral direction relative to the surface and a depth direction.

9. A method according to claim 1, wherein the irradiating comprises directing ions of different energies, wherein the ions of different energies are directed during at least one of the same time period and subsequent time periods.

10. A method according to claim 1, wherein micro-roughness is maintained.

11. A method according to claim 1, wherein micro-roughness is maintained in the range of 0.05 to 0.20 nm RMS (root means square) at a local wavelength of 10 nm to 100 μm.

12. A method according to claim 1, wherein an amount of lowering is adjusted by setting at least one of the energy of the ions and a fluence.

13. A method according to claim 1, wherein a beam current is 1 to 100 nA.

14. A method according to claim 1, wherein a beam current is 5 to 25 nA.

15. A method according to claim 1, wherein a beam current is approximately 10 nA.

16. A method according to claim 1, wherein a fluence is $10^{13}$ to $10^{16}$ ions/cm$^2$.

17. A method according to claim 1, wherein the ion beam has a diameter of 1 to 5000 μm.

18. A method according to claim 1, wherein the ion beam has a diameter of 10 to 2000 μm.

19. A method according to claim 1, wherein the ion beam has a diameter of 50 to 200 μm.

20. A method according to claim 1, wherein the ion beam is positioned with a precision of 0.1 to 50 μm.

21. A method according to claim 1, wherein the ion beam is positioned with a precision of 1 to 20 μm.

22. A method according to claim 1, wherein the ion beam is moved over the surface, with the surface being fixed in place and the ion beam being deflected.

23. A method according to claim 1, wherein the irradiating is performed laterally with respect to the surface in a range of 10 μm to several hundred mm.

24. A method according to claim 1, wherein the ions are selected from a group consisting of ions of noble and inert gases, ions of the material to be treated, non-metal ions, non-semi-metal ions and Si-ions.

25. A method according to claim 1, wherein the component is selected from the group consisting of diffractive optical elements, refractive optical elements, reflective optical elements, optical lenses and optical mirrors.

26. A method according to claim 1, wherein a refraction index of a processed portion of the component is increased in a braking range of the ions.

27. A method according to claim 26, wherein the refraction index of a fused silica component is increased to 1.6 to 1.7.

28. A method according to claim 1, wherein a refraction index of a processed portion of the component is increased by 0 to 20%.

29. A method according to claim 1, wherein a refraction index of a processed portion of a component is increased by 5 to 15%.

30. A method according to claim 1, wherein the ion beam irradiates the surface at an ambient temperature of 0 to 50° C.

31. A method according to claim 1, wherein the ion beam irradiates the surface at an ambient temperature of 15° C. to 30° C.

32. A method according to claim 1, further comprising exposing the component to a temperature treatment for a duration of at least one hour after the irradiation.

33. A method according to claim 1, further comprising exposing the component to a temperature treatment at a temperature of at least 200° C. for a duration of at least one hour after the irradiation.

34. A method according to claim 1, further comprising exposing the component to a temperature treatment at a temperature of at least 300° C. for a duration of at least one hour after the irradiation.

35. A method according to claim 1, further comprising exposing the component to a temperature treatment for a duration of at least 24 hours after the irradiation.

36. A method according to claim 1 wherein the surface is partially removed.

37. An optical element for microlithography comprising a near-surface area which is beneath the surface at a distance to the surface, wherein the area has an increased refraction index compared to a surrounding area and corresponds to a surface structuring.

38. An optical element according to claim 37, wherein plural areas of increased refraction index are disposed adjacent to each other in a direction across the surface.

39. An optical element according to claim 37, wherein plural areas of increased refraction index are disposed subsequent to each other and alternating with areas of lower refraction index in a direction across to the surface.

40. An optical element according to claim 37, wherein plural areas of increased refraction index are disposed beneath a surface section which is at the same level as sections surrounding the surface section.

41. An optical element according to claim 37, wherein plural areas with increased refraction index are disposed beneath a surface section which is lowered compared to sections surrounding the surface section.

42. An optical element according to claim 37, wherein plural areas of increased refraction index and surrounding areas of lower refraction index differ mainly in structure and not in composition.

43. An optical element according to claim 37, wherein the refraction index of the area with increased refraction index is increased by 2 to 20% with respect to the surrounding area.

44. An optical element according to claim 37, wherein the refraction index in the area with increased refraction index is increased with respect to the surrounding area by 5 to 15%.

45. An optical element according to claim 37, wherein the refraction index in the area with increased refraction index is increased with respect to the surrounding area by 7 to 10%.

46. An optical element according to claim 37, further comprising
silica,
an area with a refraction index of 1.5 at a wavelength of 193 nm, and
areas with a refraction index of 1.6 to 1.7 at a wavelength of 193 nm.

47. An optical element according to claim 37, wherein the near-surface area extends to a depth of up to 5 μm from the surface.

48. An optical element according to claim 37 further comprising regions of different compositions.

49. An optical element according to claim 37, wherein the region comprises a surface coating.

50. An optical element according to claim 49, wherein the surface coating comprises at least one of an anti-reflection coating and a reflection coating.

* * * * *

UNITED STATES PATENT AND TRADEMARK OFFICE
CERTIFICATE OF CORRECTION

PATENT NO. : 8,163,632 B2  
APPLICATION NO. : 11/950208  
DATED : April 24, 2012  
INVENTOR(S) : Martin Weiser, Stefan Burkart and Holger Maltor It is certified that error appears in the above-identified patent and that said Letters Patent is hereby corrected as shown below:

Column 1, line 56: delete "bor" and insert -- boron -- therefor

Column 4, line 57: delete "continous" and insert -- continuous -- therefor

Column 7, line 48: delete "reflactor" and insert -- reflector -- therefor

Signed and Sealed this  
Twentieth Day of November, 2012

David J. Kappos  
*Director of the United States Patent and Trademark Office*